US011481889B2

(12) United States Patent
Gandara et al.

(10) Patent No.: US 11,481,889 B2
(45) Date of Patent: *Oct. 25, 2022

(54) FIXTURE FOR EVALUATING HEADS-UP WINDSHIELDS

(71) Applicant: Pittsburgh Glass Works, LLC, Pittsburgh, PA (US)

(72) Inventors: Andres Enrique Gudino Gandara, Greensboro, NC (US); Anel Garza Rivera, Nuevo Leon (MX); Felipe Guzman Botero, Karlstruhe (DE)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,866

(22) Filed: Apr. 1, 2021

(65) Prior Publication Data
US 2021/0224974 A1 Jul. 22, 2021

Related U.S. Application Data

(63) Continuation-in-part of application No. 16/838,622, filed on Apr. 2, 2020.

(60) Provisional application No. 63/003,976, filed on Apr. 2, 2020, provisional application No. 62/828,591, filed on Apr. 3, 2019.

(51) Int. Cl.
*H04N 7/18* (2006.01)
*G06T 7/00* (2017.01)
*G02B 27/01* (2006.01)
*H04N 5/232* (2006.01)
*H04N 5/247* (2006.01)

(52) U.S. Cl.
CPC ........ *G06T 7/0004* (2013.01); *G02B 27/0101* (2013.01); *H04N 5/23299* (2018.08); *H04N 5/247* (2013.01); *G02B 2027/0147* (2013.01); *G02B 2027/0198* (2013.01); *G06T 2207/30168* (2013.01)

(58) Field of Classification Search
CPC ........ B60R 2021/0006; B60R 21/0134; B60R 19/205; B60R 2021/0004; B60R 2021/0018; B60R 21/23138; B32B 17/10036; B32B 17/10568; B32B 2605/006; H04N 9/3185
USPC .......................................................... 348/92
See application file for complete search history.

(56) References Cited

U.S. PATENT DOCUMENTS

| | | | |
|---|---|---|---|
| 2011/0102874 A1* | 5/2011 | Sugiyama | G02B 26/106 359/205.1 |
| 2015/0243068 A1* | 8/2015 | Solomon | H01L 27/156 345/419 |
| 2017/0072663 A1* | 3/2017 | Sadakane | G02B 27/0101 |
| 2019/0317328 A1* | 10/2019 | Bae | G02B 27/0093 |
| 2020/0026073 A1* | 1/2020 | Nambara | G02B 27/286 |
| 2020/0033600 A1* | 1/2020 | Kweon | G02B 5/3058 |
| 2020/0116999 A1* | 4/2020 | Watanabe | G02B 6/003 |

(Continued)

*Primary Examiner* — Masum Billah
(74) *Attorney, Agent, or Firm* — Dentons Cohen & Grigsby P.C.

(57) ABSTRACT

A test fixture (10) for HUD windshields (12) wherein aspherical devices (26) compensate for complex curvatures and optical aberrations in a heads-up display surface (16) of the windshield. Tunable lenses cooperate with a movable test matrix to improve image resolution and enhance ghost image reduction.

17 Claims, 12 Drawing Sheets

(56) References Cited

U.S. PATENT DOCUMENTS

2021/0029334 A1\* 1/2021 Wei ..................... H04N 9/3194

\* cited by examiner

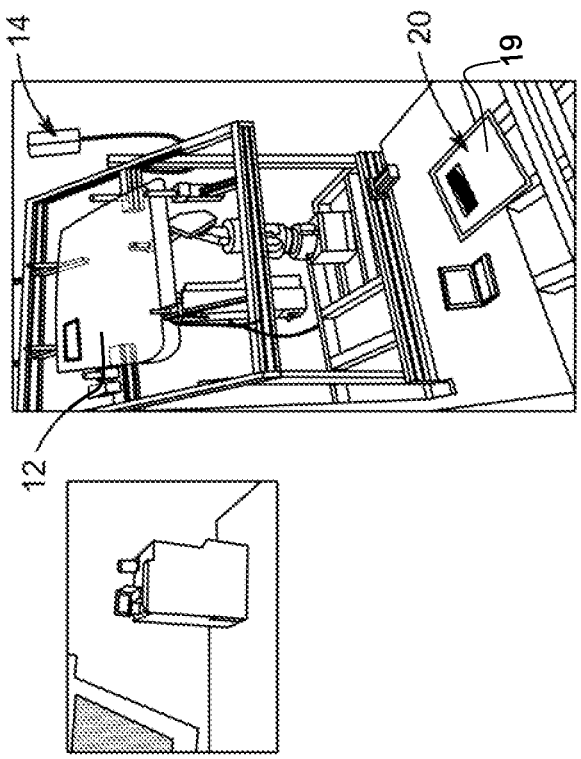
FIG. 3
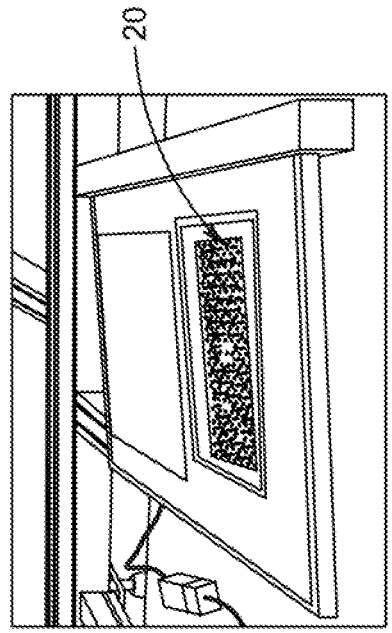
FIG. 4
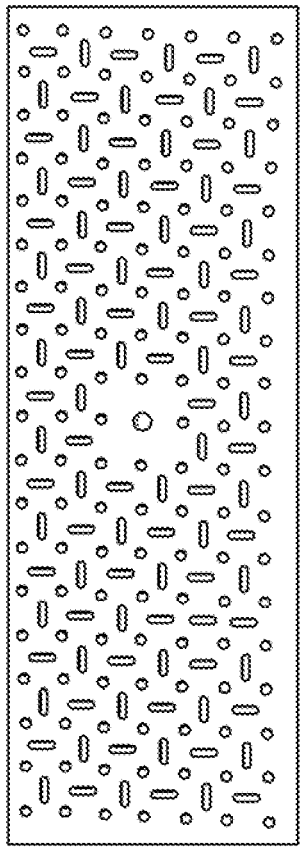
FIG. 2
Virtual image focusing
flat metal test grid
test grid with tilt
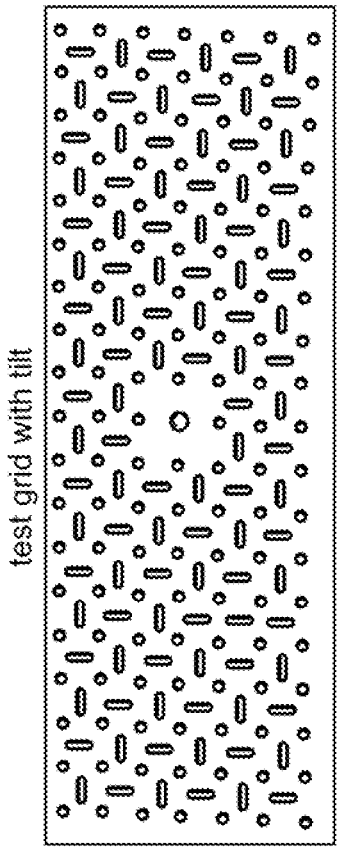

FIG. 10
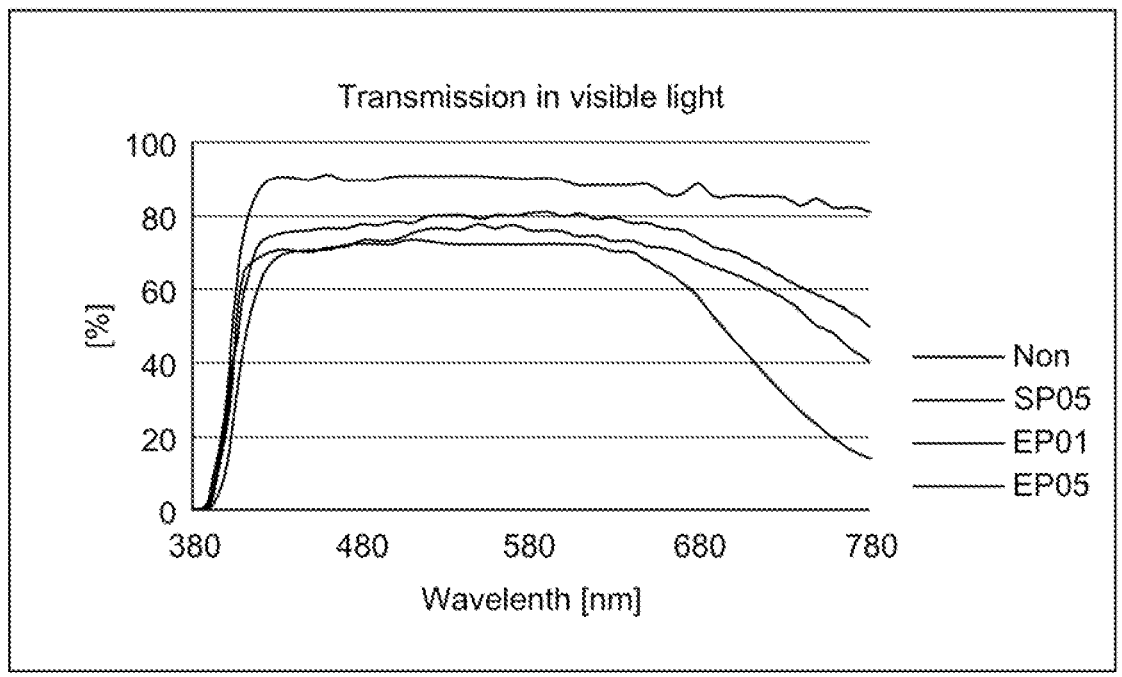
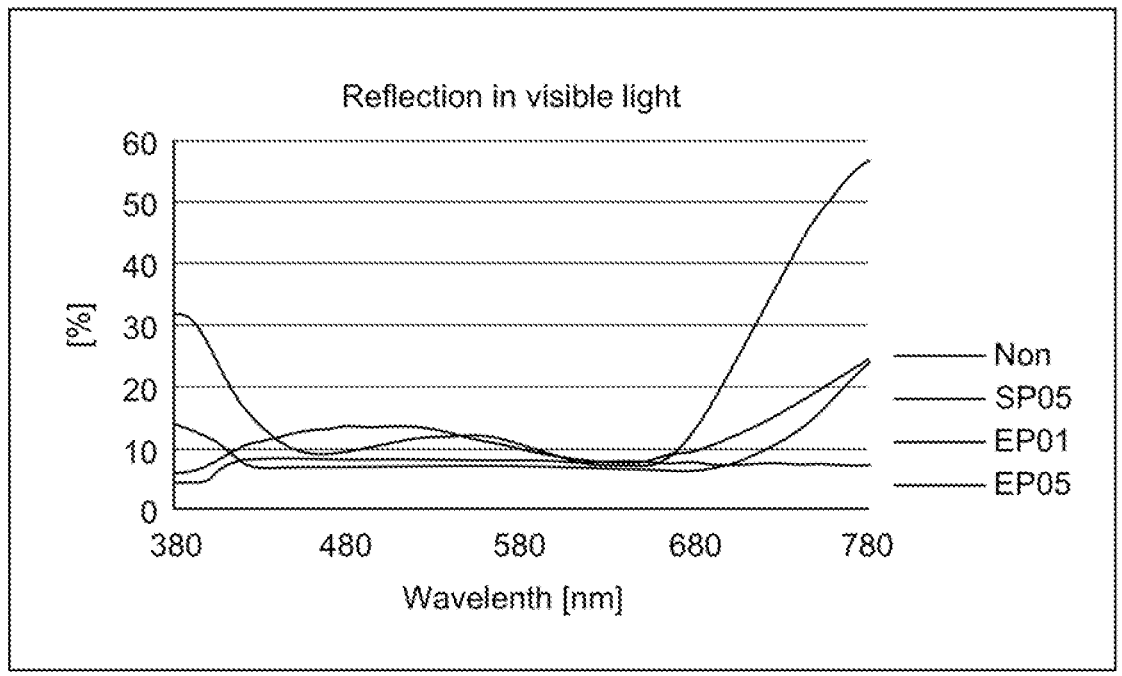

FIG. 10 (Cont'd)
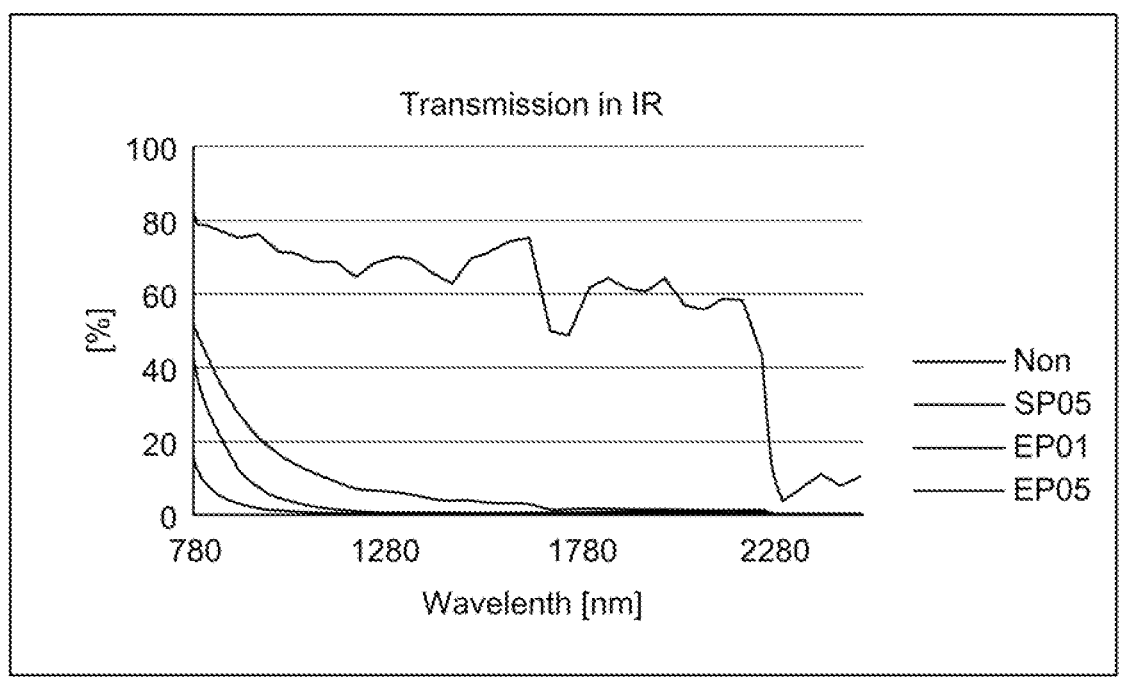
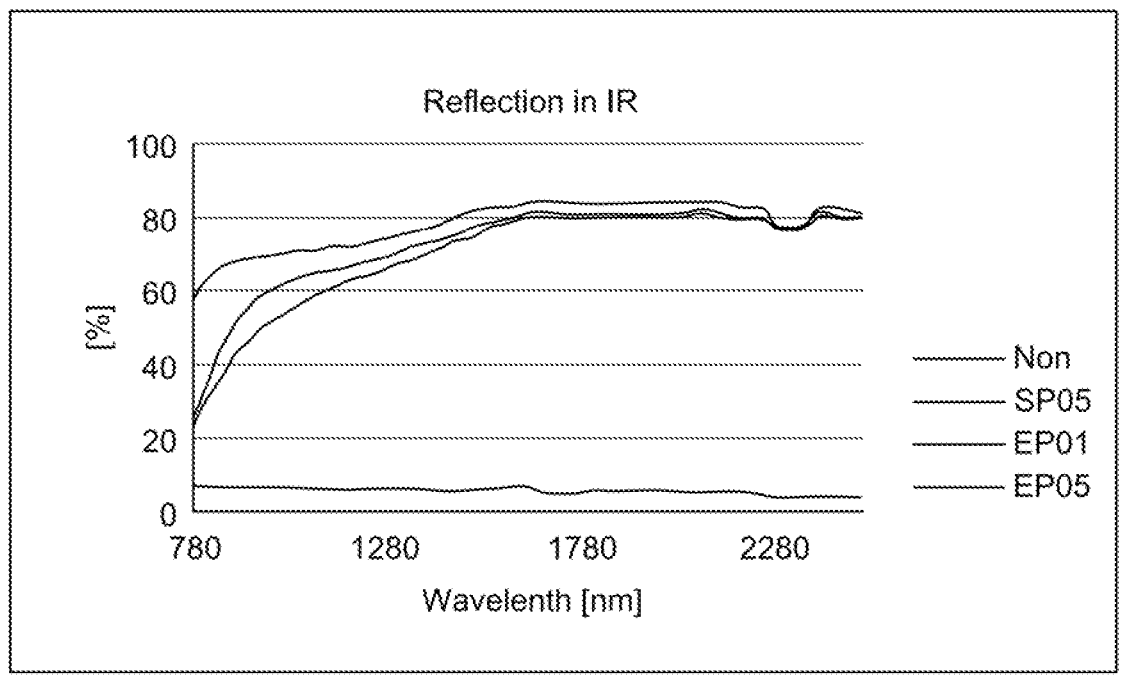

FIG. 11
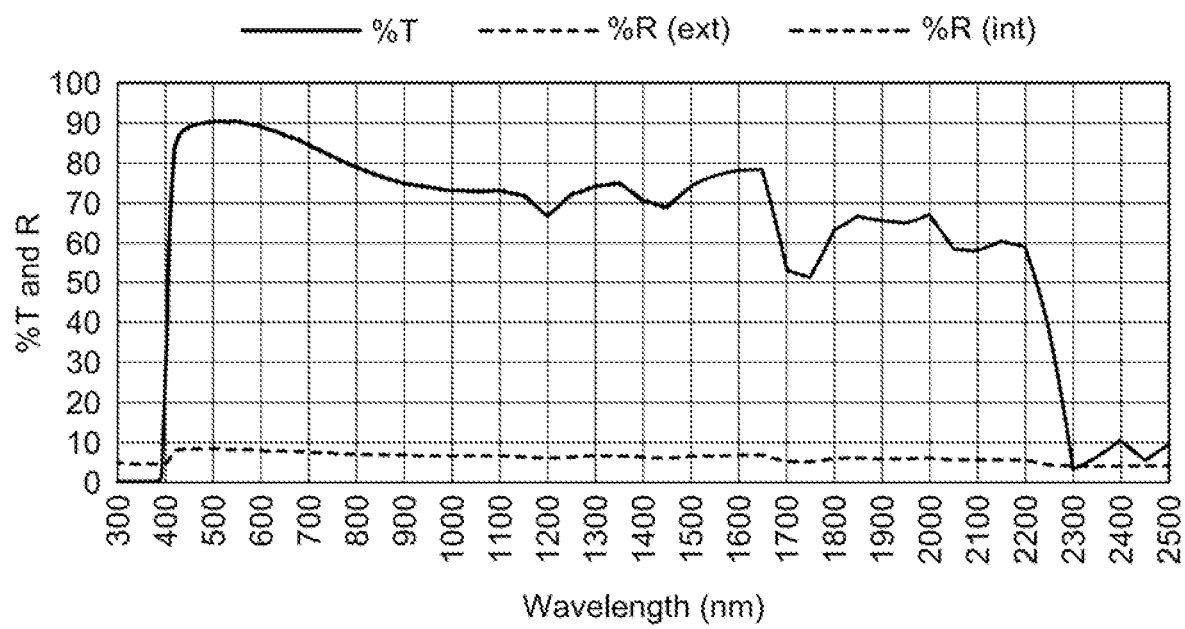
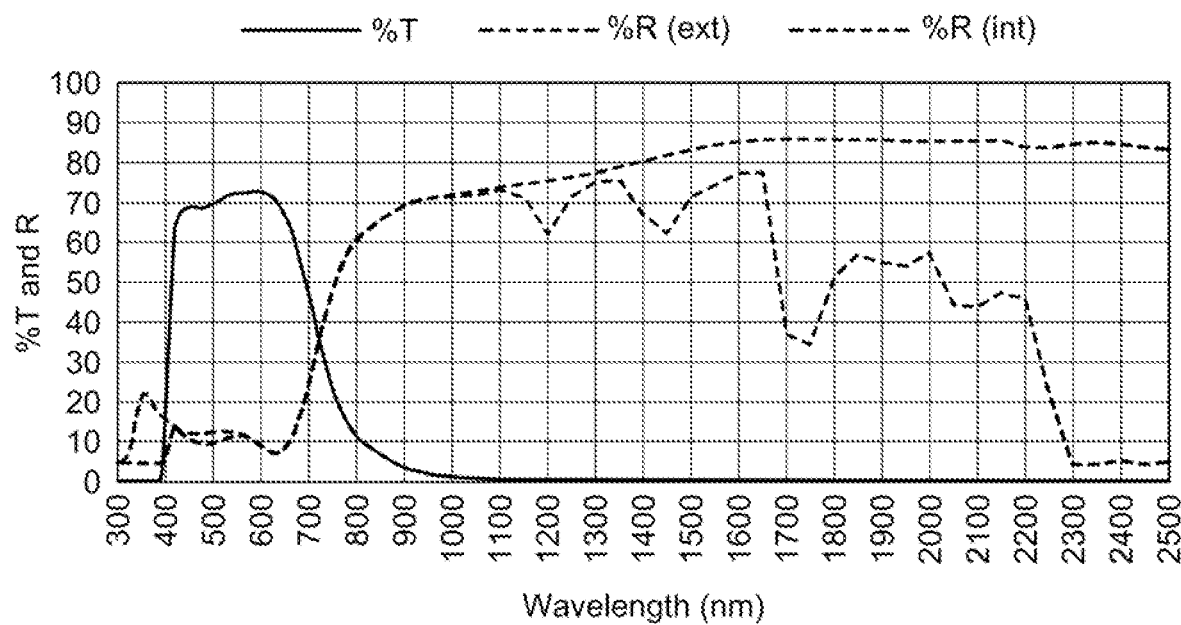

FIG. 11 (Cont'd)

| Wavelength [nm] | Transmission | Reflection | Wavelength [nm] | Transmission | Reflection |
|---|---|---|---|---|---|
| 380 | 0.0001 | 0.0453 | 380 | 0.0001 | 0.0453 |
| 385 | 0.0015 | 0.0452 | 385 | 0.0008 | 0.0452 |
| 390 | 0.0143 | 0.0451 | 390 | 0.0082 | 0.0451 |
| 395 | 0.0794 | 0.0453 | 395 | 0.0498 | 0.0461 |
| 400 | 0.2446 | 0.0479 | 400 | 0.1632 | 0.0553 |
| 410 | 0.6675 | 0.0666 | 410 | 0.4841 | 0.1102 |
| 420 | 0.8405 | 0.0791 | 420 | 0.6374 | 0.1329 |
| 430 | 0.8743 | 0.0816 | 430 | 0.6764 | 0.1251 |
| 440 | 0.8826 | 0.0821 | 440 | 0.6864 | 0.1141 |
| 450 | 0.8881 | 0.0823 | 450 | 0.6895 | 0.1051 |
| 460 | 0.8947 | 0.0826 | 460 | 0.6906 | 0.0990 |
| 470 | 0.8965 | 0.0825 | 470 | 0.6891 | 0.0951 |
| 480 | 0.8982 | 0.0824 | 480 | 0.6895 | 0.0937 |
| 490 | 0.8997 | 0.0823 | 490 | 0.6928 | 0.0944 |
| 500 | 0.9015 | 0.0822 | 500 | 0.6994 | 0.0969 |
| 510 | 0.9025 | 0.0821 | 510 | 0.7066 | 0.1004 |
| 520 | 0.9032 | 0.0819 | 520 | 0.7132 | 0.1043 |
| 530 | 0.9023 | 0.0817 | 530 | 0.7182 | 0.1079 |
| 540 | 0.9029 | 0.0815 | 540 | 0.7231 | 0.1107 |
| 550 | 0.9008 | 0.0812 | 550 | 0.7248 | 0.1118 |
| 560 | 0.8997 | 0.0809 | 560 | 0.7268 | 0.1111 |
| 570 | 0.8972 | 0.0805 | 570 | 0.7275 | 0.1082 |
| 580 | 0.8947 | 0.0802 | 580 | 0.7277 | 0.1034 |
| 590 | 0.8931 | 0.0799 | 590 | 0.7286 | 0.0970 |
| 600 | 0.8900 | 0.0795 | 600 | 0.7275 | 0.0895 |
| 610 | 0.8862 | 0.0790 | 610 | 0.7238 | 0.0816 |
| 620 | 0.8823 | 0.0786 | 620 | 0.7173 | 0.0753 |
| 630 | 0.8784 | 0.0782 | 630 | 0.7067 | 0.0720 |
| 640 | 0.8728 | 0.0776 | 640 | 0.6894 | 0.0735 |
| 650 | 0.8694 | 0.0772 | 650 | 0.6676 | 0.0821 |
| 660 | 0.8649 | 0.0767 | 660 | 0.6373 | 0.0986 |
| 670 | 0.8599 | 0.0762 | 670 | 0.5996 | 0.1243 |
| 680 | 0.8551 | 0.0758 | 680 | 0.5559 | 0.1583 |
| 690 | 0.8496 | 0.0752 | 690 | 0.5074 | 0.1997 |
| 700 | 0.8438 | 0.0747 | 700 | 0.4562 | 0.2460 |
| 710 | 0.8385 | 0.0742 | 710 | 0.4055 | 0.2953 |
| 720 | 0.8329 | 0.0737 | 720 | 0.3563 | 0.3436 |
| 730 | 0.8273 | 0.0732 | 730 | 0.3109 | 0.3913 |
| 740 | 0.8220 | 0.0727 | 740 | 0.2696 | 0.4351 |
| 750 | 0.8158 | 0.0722 | 750 | 0.2326 | 0.4745 |
| 760 | 0.8101 | 0.0717 | 760 | 0.2003 | 0.5099 |
| 770 | 0.8050 | 0.0713 | 770 | 0.1726 | 0.5415 |
| 780 | 0.7995 | 0.0708 | 780 | 0.1487 | 0.5675 |

FIXTURE FOR EVALUATING HEADS-UP WINDSHIELDS

RELATED APPLICATIONS

This application claims priority to U.S. Provisional Patent Application No. 62/828,591 filed Apr. 3, 2019, U.S. Provisional Patent Application No. 63/003,976 filed Apr. 2, 2020, and to U.S. Non-Provisional application Ser. No. 16/838,622 filed Apr. 2, 2020, the entirety of all of which are hereby specifically incorporated by reference.

BACKGROUND OF THE INVENTION

Field of the Invention

The presently disclosed invention relates to heads-up displays in the forward-facing windshields of vehicles and, more particularly, methods and systems for evaluating compliance of such windshields with heads-up-display ("HUD") performance specifications.

DISCUSSION OF THE PRIOR ART

Heads-up display systems have been used in prior vehicles to project an image in the field-of-view of the vehicle operator. Typically, the image displays information concerning vehicle system conditions such as fluid pressures or temperatures, or conditions regarding the external vehicle environment such as ambient temperature or elevation. The display of this information in the operator's normal field-of-view allows the operator to monitor that information without distracting attention from the pathway of the vehicle. This allows for better informed, safer operation of the vehicle.

In heads-up displays, an illumination beam of the display image is projected from a location inside the vehicle onto an inside surface of the windshield. Most of the illumination beam is reflected by the inside surface of the windshield in a direction toward the operator. The position and incident angles of the illumination beam are controlled such that the reflected beam is visible to the operator. The operator sees the reflected beam in such a way that it appears to originate from a focal point on the outer side of the windshield. That is, the operator interprets the projected image to be originating from a point that is outside (and in front of) the vehicle.

Vehicle safety considerations have generally required that forward-facing windshields have a laminate construction wherein two panels of annealed glass or other transparent material are laminated together with a sheet of transparent interlayer material such as polyvinyl butyral ("PVB") or similar material. The interlayer material is sandwiched between the two transparent panels. If an impact to the windshield fractures the windshield panels, the shards of broken glass generally remain attached to the interlayer. This limits dispersion of the glass fragments and the consequent risk of injury to the vehicle operator or passengers.

It has been found that such laminated windshields complicate the reflection of heads-up displays. While much of the illumination beam is reflected from the inside surface of the windshield, some of the illumination beam is reflected from other surface boundaries of the windshield. More specifically, a portion of the illumination beam is refracted at the inside surface of the windshield and propagates through the inner transparent panel toward the interlayer and the outer transparent panel. Surface boundaries of the interlayer and the inner and outer transparent panels of the windshield are generally referred to by reference number—"surface number 1" for the outside surface of the outermost transparent panel; "surface number 2" for the surface of the outermost panel that is opposite from surface number 1 and that faces the interlayer; "surface number 3" for the surface of the innermost transparent panel that faces the interlayer; and "surface number 4" for the surface of the innermost transparent panel that is opposite from surface number 3. Surface number 4 is also the inner surface of the windshield.

The number 2 and number 3 surfaces are located at a transition between the material of the interlayer and the material of the inner and outer panels. The number 1 and number 4 surfaces represent transition between the material of the inner and outer panels and the atmosphere. Each transition represents a change in refractive index and a reflection from each surface boundary. Accordingly, each of surfaces 1, 2, 3, and 4 reflect some portion of the illumination beam back toward the operator. Light that is incident to surfaces 1, 2, 3, and 4 and reflected toward the operator may appear to the operator as respective, separate images that are laterally separated. The lateral separation between the separate images is determined according to the angle of incidence and the separation between surfaces 1, 2, 3, and 4 according to the thicknesses of the inner transparent panel, the interlayer, and the outer transparent panel.

The change in refractive index is greatest at surface number 1 and surface number 4 so the reflections from those surfaces are the most intense. The number 1 surface and the number 4 surface of the windshield are separated by the overall thickness of the windshield. The image from light that is reflected from the number 4 surface of the windshield does not pass through any portion of the windshield whereas light that is reflected from the number 1 surface of the windshield passes through the thickness of the windshield twice. Accordingly, the operator will see light reflected from the number 1 surface of the windshield to have lower intensity (i.e. a fainter image) than light reflected from the number 4 surface. Due to this fainter appearance, the image reflected from the number 1 windshield surface is often referred to as a "ghost" image.

It has been recognized that the source of the ghost image in heads-up displays is reflection from the number 1 surface of the windshield. It has been recognized that lateral separation of the ghost image from the primary image is determined by the geometry of the illuminating light pathway and the separation between the number 1 surface and the number 4 surface of the windshield. Accordingly, a solution to observing ghost images in heads-up displays has been to modify the geometry of the separation between the number 1 surface and the number 4 surface of the windshield. Namely, the interlayer has been modified to be progressively thinner near the lower edge of the windshield so that a vertical cross-section of the interlayer is wedge-shaped. The wedge shape is calculated to superimpose the reflections from the number 1 surface and the number 4 surface as seen by the operator and conceal the distracting "ghost" image.

While the use of wedge-shaped interlayers and other developments have controlled distracting double images and made other quality improvements to heads-up displays, other difficulties still have persisted. For example, issues of aerodynamics, function and fashion are dominant factors concerning the orientation, shape and geometry of vehicle windshields. Windshields have developed to have a relatively complex shape with a different shape for virtually every make and model of automobile.

The broad variety of windshield shapes, orientations, and sizes and the virtual nature of the heads-up-display ("HUD") itself have caused difficulty in testing windshields against specifications for resolution and clarity of the HUD image as well as other performance specifications for windshields used in HUD systems. For example, systems for testing HUD windshield performance includes cameras for viewing the HUD image presented to the vehicle operator. Such cameras typically include a conventional, fixed lens that can attain only one focal point at a time. However, a fixed camera lens is incapable of focusing the entire HUD display image that originates from numerous focal points. The inclined orientation of the windshield with respect to the operator's point of observation results in the focal plane at the top of the image being closer than the focal plane at the bottom of the HUD image. This difference in focal planes creates a lack of focus in the HUD image.

Also, differences of tangential and sagittal radius of the windshield's curvature typically require more than one focal point for images viewed through the windshield and often cause the camera to capture blurred images. Optical aberrations in the HUD reflective surface also may result in other image complications such as astigmatism and coma, especially in applications where the apparent location of the virtual HUD image is a substantial distance from the windshield. Such circumstances may cause camera images to be unclear so that camera-based automatic test fixtures have difficulty in reliably assessing the HUD performance quality and compliance with performance specifications.

Compounding the forgoing difficulties, HUD windshield specifications are changing to require greater size and a wider field of view for the reflected HUD image. Such changes require the test fixture to make more precise spatial measurements to confirm compliance with performance specifications. In addition, HUD windshields are also changing to require that HUD images have greater apparent distance from the windshield. This requires greater focal length for the reflected HUD images and necessitates wider range and more precise control of focal length. Still further, HUD windshields are also requiring higher resolution of the MUD display. This, in turn, demands higher resolution capability for the test fixture.

The presently disclosed invention overcomes the lack of focus and other difficulties in prior test systems and other by compensating for differences in the optical pathway of the HUD image.

Human vision addresses the complexities of a HUD image by use of flexible lenses. More specifically, human eye lenses change shape under control of ciliary muscles that are adjacent the eye lenses. Such muscles stretch or squeeze the lenses to change their focal length.

Some cameras have capability for viewing objects at different focal lengths by adjusting the relative position of multiple lenses. The lenses are moved closer or further relative to each other by manual or motorized control. Such lenses are called optical zooms. Digital cameras may sometimes mimic the process of varying the physical separation between multiple lenses with computer software that manipulates a digital version of the optical image. The software effectively scales up a smaller part of the original image to "zoom in" or uses a larger part of that image to "zoom out." Digital zoom cameras have a disadvantage in that they tend to lose detail and blur images.

In the context of the forgoing difficulties and enhancements, camera lenses and other mechanical elements of prior test fixtures and test protocols have inherent limitations that do not duplicate human visual sense. Those limitations have complicated test fixtures for HUD windshields. For example, in test fixture embodiments, windshield compliance with HUD performance specifications is a computed result based on multiple measurements. The computational nature of the test evaluation allows the test fixture to determine the quality of certain HUD images even when the components of the test fixture do not actually hold the physical positions for which the HUD image is evaluated. The test fixture is capable of accurately determining HUD image quality under such conditions because compliance with HUD specifications is a computed result and the test fixture's computational capabilities include a capacity to anticipate and account for deviations between actual physical positions of the test fixture components and the positions for which the HUD image is being evaluated.

The test fixture's capability to account for deviations between the actual position of fixture components and the positions under evaluation is a helpful feature because it enables the test fixture to limit or avoid certain mechanical movements and thereby examine windshields at a faster rate. However, this same feature also may sometimes create uncertainty for human observers of the test fixture.

Human senses do not compensate for deviations between the HUD image that a human observes and the HUD image as it appears from a different viewpoint. Humans have no capability to evaluate the quality of a HUD image except from a viewpoint that they physically hold. A human observer sees and understands images that may be acceptable if seen from a different viewpoint as being distorted or out-of-focus if that is the appearance of the HUD image from their actual viewpoint. Humans do not apply anticipatory, computational adjustments in the manner of a computer in a test fixture. Thus, deviations of the test fixture's computed conclusions from human observations may cause the human observer to question the correctness of the test fixture's compliance evaluations. Accordingly, there has been a need for a testing fixture that would limit this cause of uncertainty by more closely mimicking human sensory capabilities.

Accordingly, there has been a need for a test fixture that windshield manufacturers may use to quickly, reliably, and repeatedly test the quality of windshields for use in HUD applications over a range of vehicle makes and models.

SUMMARY OF THE INVENTION

In accordance with the presently disclosed invention, a test fixture supports testing windshields that are intended for use in vehicles with HUD systems. The purpose of the testing is to confirm that the windshields meet the performance specifications for clarity, size, and apparent origin of virtual images in a "heads-up display" (herein "HUD"). The test system is a fully automatic system that includes compensation for differences between optical and computational capabilities of test fixtures and human senses.

The presently disclosed invention includes a frame that holds components of the test fixture in place with respect to each other and with respect to the windshield that is the test object. Components of the test fixture may include a test matrix, a camera with a tunable lens, and a computer that is configured to identify and measure elements of the test matrix that appear in a virtual image of a heads-up display. The frame maintains the windshield that is under test. The windshield includes a transparent panel that defines a heads-up display ("HUD") surface. The test matrix defines a test pattern that illuminates the HUD surface of the windshield and is reflected from the HUD surface to at least one tunable lens of a camera.

The tunable lens may modify light that is reflected from the HUD surface and is incident on the lens by modifying an electronic version of the visual image or by modifying the size and/or shape of the lens to vary the visual image.

The test fixture may also include a tunable lens to cure optical aberrations such as astigmatism and comma that derive from the curvature of the windshield as well as other causes. The tunable lens is situated in the path of the illumination beam that travels from the test matrix to the HUD surface, and from the HUD surface to the camera. When the tunable lens is illuminated by the light beam from the test matrix, it modifies the light beam to compensate for the effects of the windshield's curvature and for optical aberrations in the HUD surface. The light beam thus modified and reflected from the HUD surface tends to present the camera lens with virtual HUD images having higher resolution. Such higher resolution enhances the accuracy and reliability of the test fixture.

In alternative embodiments, the test fixture includes a tunable lens that is an aspheric device that converts the visual image to an electronic equivalent and then modifies the electronic equivalent to compensate for curvatures in the windshield and aberrations in the heads-up surface so that the reflected image from the heads-up surface can be more accurately focused by the camera.

In another embodiment, the test fixture includes a tunable lens that is a liquid lens having a customized radius of curvature or a toroidal shape. The liquid lens is illuminated by light that is reflected from the HUD surface toward the camera. The liquid lens refracts the light to compensate for curvatures in the windshield and aberrations in the heads-up surface so that the camera can better focus the image reflected from the HUD surface.

In some cases it is preferred that the test matrix is a grid plate and light source. The grid plate may be attached to the frame in fixed relationship or may be moveable with respect to the HUD surface of the transparent panel. In embodiments, the grid plate can be moved to positions further away from the HUD surface and the camera can be moved to a lower elevation relative to the frame to better evaluate the HUD quality of the windshield from the perspective of a vehicle operator of shorter stature. To better evaluate the HUD capability of the windshield from the prospective of a vehicle operator of taller stature, the position of the grid plate can be moved toward the heads-up surface and a higher elevation relative to the frame by moving the camera to a higher elevation relative to the frame.

In other embodiments, the grid plate can be made pivotal about a first axis to adjust the separation between the grid plate and the HUD surface and increase resolution of the image in the grid plate and the virtual HUD image.

Especially in cases wherein the windshield includes an IR coating, it may also be preferred to add a band-pass filter to the test fixture. The IR coating may reflect light to the camera that appears as a second ghost image. The filter is located between the HUD surface and the camera lens and passes only light within a bandwidth of a portion of the visible light spectrum where reflectivity of light from the IR coating is lowest. In this way, the intensity of the second ghost image is low and the test fixture is less likely to interpret the virtual image incorrectly due to the presence of the secondary ghost image.

Other objects and advantages of the presently disclosed invention will become apparent to those skilled in the art as the following description of a presently preferred embodiment thereof proceeds.

BRIEF DESCRIPTION OF THE DRAWINGS

A presently preferred embodiment of the presently disclosed invention is described herein and illustrated in connection with the accompanying drawings wherein;

FIG. 2 shows examples of virtual images of test grids as imaged by a camera according to the presently disclosed invention;

FIG. 3 shows a test fixture that is similar to the test fixture of FIG. 1 with the test grid in a tilted position;

FIG. 4 shows the test grid that is similar to the test fixture that is shown in FIG. 3;

FIG. 10 shows a diagrams of light transmissivity and reflectivity of IR coated laminates over various wavelengths; and FIG. 11 is a line graph showing the transmissivity and reflectivity of glass laminates with and without IR coatings over a range of wavelengths.

PRESENTLY PREFERRED EMBODIMENTS OF THE INVENTION

Figure 1:
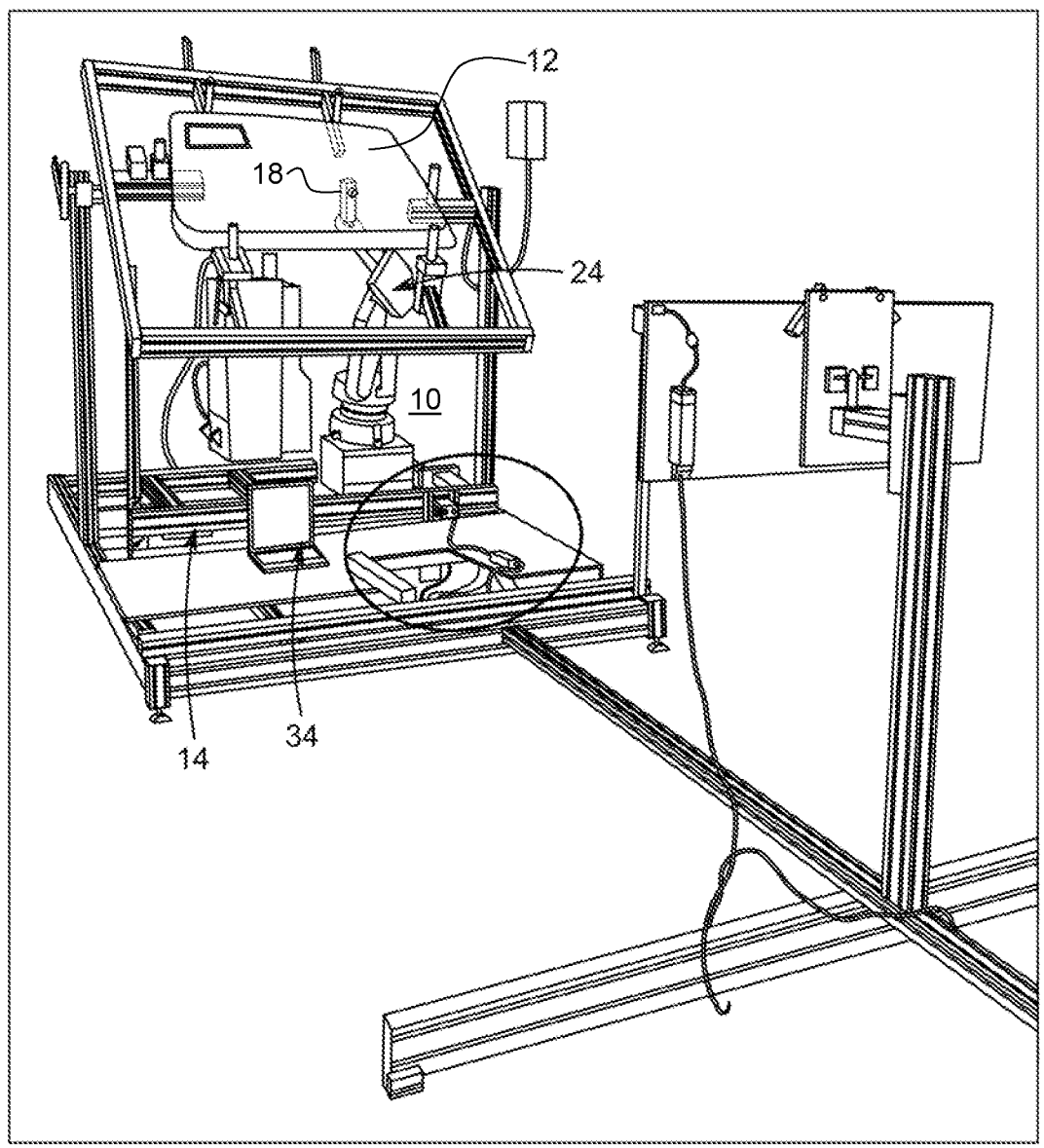
FIG. 1 shows an example of a test fixture in accordance with one embodiment of the presently disclosed invention.

An embodiment of the presently disclosed invention is shown in FIG. 1. In FIG. 1, a test fixture 10 supports testing of windshields that are intended for use in vehicles with heads-up display systems. More specifically, test fixture 10 tests the performance of the heads-up display ("HUD") feature of a windshield 12 that is intended for use in a selected make and model of a vehicle. The purpose of the testing is to confirm that the windshield meets the vehicle manufacturer's specifications for clarity, size, and resolution of virtual images in the heads-up system ("the HUD virtual image"). Test system 10 is a mechanical system that includes compensation to close differences between mechanical imaging and human vision capabilities.

Test fixture 10 includes a frame 14 that maintains windshield 12 that is under test. Windshield 12 includes a transparent panel that defines a surface 16 used in the production of heads-up displays. Heads-up display ("HUD") surface 16 may include one or more optical aberrations. Optical aberrations are referred to herein as a property of an optical system that causes light to spread over an area as opposed to being focused at a point. Aberrations can result in distortion or blurring of an image. The nature of the distortion depends on the type of aberration. In an imaging system, an aberration can cause light from a point on an object to fail to converge to a single point after transmission through the imaging system. Other reasons for distortion and blurring of an image include differences of the tangential and sagittal radius of the windshield's curvature. Differences in the tangential and sagittal radius in the windshield's curvature cause optical aberrations such as astigmatism and comma in the HUD image. Such conditions also may result in more than one focal point for images viewed through the windshield. Such optical aberrations in the HUD image are further accentuated as the apparent location or origination of the HUD image is positioned further from the windshield. The further image lengths equate to longer focal lengths in the imaging system. Such differences make the system more sensitive to focal point errors. A failure to resolve light to a single focal point may compromise the accuracy and reliability of a text fixture for proving compliance with windshield specifications for heads-up displays.

As further explained below, test fixture 10 includes a camera 18 that includes a tunable lens 21. Cameras with a fixed lens attain only one focal point at a time. However, differences of tangential and sagittal radius of the windshield's curvature may result in more than one focal point for images that are viewed through the windshield. This may result in blurring the image presented to the camera lens. Additionally, optical aberrations in the HUD surface 16 can result in other image distortions. Under such conditions, camera images may be unclear and cause difficulties for camera-based automatic test fixtures to reliably use such images to assess the quality of the HUD windshield and compliance with manufacturer's specifications.

In test fixture 10, a test matrix 19 is an image generating unit. The location and direction of an imaging beam 22 from test matrix 19 determines the length and direction of the optical path of light from the imaging beam that the vehicle operator views as the HUD image. A beam 22 from test matrix 19 such as a light source and test grid 20 defines an optical test pattern that illuminates HUD surface 16 of windshield 12. The test pattern of the test grid 20 is reflected from HUD surface 16 to tunable lens 21 of camera 18.

Test grid and light source 20 is mounted on frame 14 and transmits beam 22 that defines a test pattern. The test pattern is configured in accordance with the particular windshield that corresponds to a selected make and model of vehicle.

Figure 5:
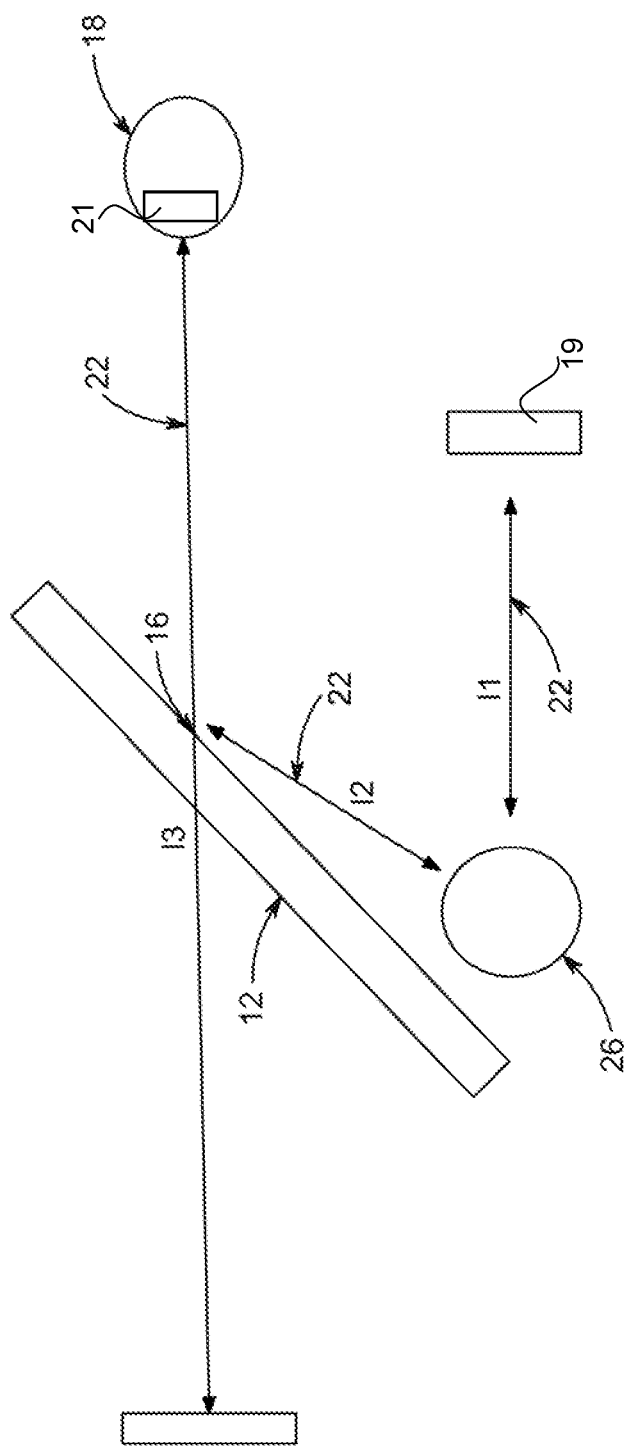
FIG. 5 is a diagram that illustrates an embodiment of the presently disclosed invention that includes an aspheric mirror.
Figure 6:
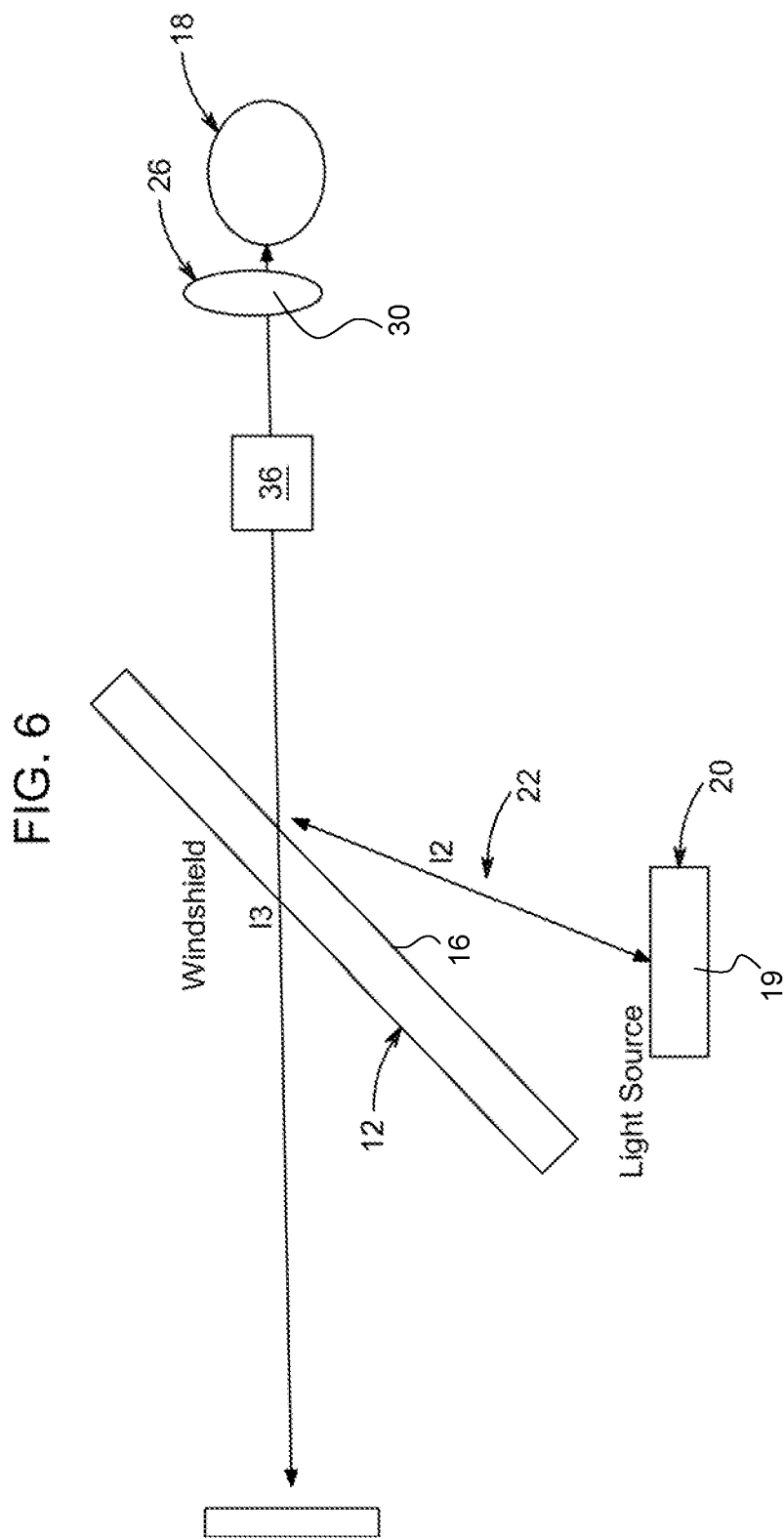
FIG. 6 is a diagram that illustrates an embodiment of the presently disclosed invention that includes an aspheric lens.

FIGS. 5 and 6 illustrate that test grid and light source 20 generate a light beam 22. Light beam 22 defines a test pattern of test grid 20 such that, when light beam 22 illuminates HUD surface 16 of the inner transparent panel of windshield 12, at least a portion of light beam 22 (and the incorporated test pattern) is reflected from HUD surface 16 of the transparent panel that is illuminated by light beam 22.

As shown in FIG. 1, camera 18 is mounted on a robot 24 that can manipulate the position of camera 18 with respect to frame 14. Alternatively, camera 18 can be mounted in fixed fashion to frame 14. Camera 18 is located and oriented to receive and record the test pattern of a test matrix such as test grid 20 that is reflected from HUD surface 16. Examples of test patterns of test grid 20 that are presented to camera 18 are shown in FIG. 2.

Alternatively, the test matrix of the presently disclosed fixture may project a test pattern as a projected image in place of a test pattern such as from test grid and light source 20. The projected test pattern is quickly and easily changeable electronically to project different test patterns. In that way, the test matrix can project different test patterns correlating to respective, various driver "eye box" positions as well as correlating to the geometry and size of various windshield models. Test matrices of this type that enable different projected test patterns for various, respective windshield models avoid the need to mechanically, substitute different test grids to test different respective windshield models.

Test fixture 10 further includes a computer 34 that is configured to enable test fixture 10 to identify and measure elements of the test pattern of test grid 20 (or other, alternative test matrix) that are exposed to camera 18 as a virtual HUD image. Computer 34 compares the HUD image to the actual test pattern of the test matrix to compute applicable performance specifications.

To better suppress the effect of ghost images, the disclosed test fixture 10 controls the exposure time of camera 18. The lower light intensity of ghost reflections means that the brighter reflections of the primary image reflected from HUD surface 16 tend to dominate the weaker "ghost" reflections. By limiting the time of exposure of the lens of camera 18 to the virtual HUD image, the brighter reflections may dominate the weaker "ghost" reflections. Cameras that have a fixed lens have a focal length that is defined by the physical shape and dimensions of the lens. Such lenses are capable of accurately collecting an image at only one specific distance from the lens. The resolution of an image at various photo lengths may be improved by changing the shape and/or dimensions of the lens to accommodate multiple focal lengths. In the past, such accommodations have been limited because modifications of the lens are implemented by controlling the physical separation between a plurality of fixed lenses.

In the presently disclosed embodiment, camera 18 employs tunable lens 21. Tunable lens 21 enables changes in magnification and focal length without changing the physical separation between multiple fixed lenses. Tunable lens 21 avoids relatively large mechanical movements of multiple lenses. This feature enables test fixture 10 to examine windshields more quickly and more repeatedly and with a longer operational life expectancy of the lens 21 and other fixture components in comparison to prior test fixtures.

Tunable lenses in accordance with the disclosed invention may include optical compensation lenses that cooperate with a fixed test grid as opposed to modifying the physical position of the test grid. The disclosed compensation lenses control the effective focal length by processing an electronic version of the optical test pattern.

As used herein, "optical compensation" refers to corrections to imperfections such as vignetting, distortion, and chromatic aberration in a camera image due to imperfections in the optical components such as HUD surface 16. In "optical compensation" an electronic component (that may be included in the body of camera 18) may modify the electronic equivalent of the optical image.

As also used herein, "tunable lenses" also include "liquid lenses" that physically modify the shape and/or size of the lens in response to electrical signals that are applied to the lens. Liquid lenses quickly adjust focus to accommodate objects located at various working distances (WDs). Liquid lenses are small, mechanically, or electrically controlled cells that contain optical-grade liquid. An electrical current or voltage may be applied to the liquid cell to vary the shape of the cell. This change typically occurs within milliseconds and causes the optical power, and therefore focal length and WD, to shift. Liquid lenses operate across a wide range of optical powers (focal lengths) at high speeds. By eliminating the moving parts and mechanical adjustments typically found in fixed focal length and zoom lenses, the focusing process is made much faster. Liquid lenses operate according to various processes: electrowetting, current-driven polymer, or sound piezoelectric.

Figure 7:
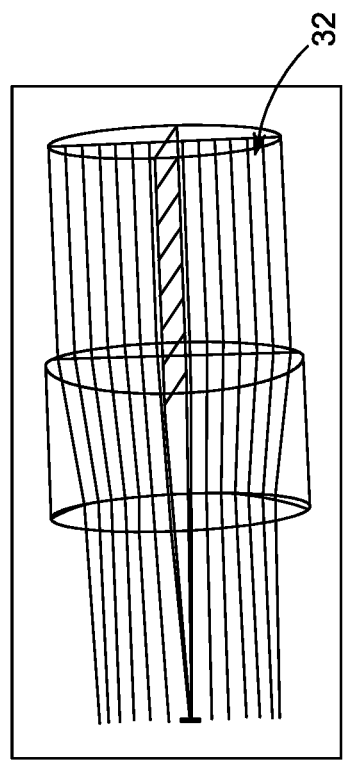
FIG. 7 is a diagram that illustrates a toroidal aspheric lens of a type that is suitable for use in the embodiment illustrated in FIG. 6.

As previously discussed herein, complex curvatures in the surface of windshield 14 and optical aberrations in heads-up display surface 16 may cause the test pattern of the test matrix to be unclear. This may cause test fixture 10 difficulty in reliably assessing the HUD performance of windshield 12. As illustrated in FIGS. 5, 6, and 7, test fixture 10 may include a device 26 that has an aspheric surface to attain an improved assessment of the heads-up display performance of windshield 12. Aspheric device 26 is located in the path of light beam 22 that travels from the test matrix to HUD surface 16, and from HUD surface 16 to camera 18. When the aspheric device 26 is illuminated by light beam 22 from the test matrix, the aspheric device modifies light beam 22 to compensate for the effects of differences in the windshield's curvature and for optical aberrations in HUD surface 16. Thus modified, light beam 22 tends to produce images to camera 18 with higher resolution and enhances the accuracy and reliability of test fixture 10.

FIGS. 5 and 6 illustrate that test fixture 10 may include different types of aspheric devices 26. In the embodiment of FIG. 5, aspheric device 26 is an aspheric mirror 28 that is positioned in the pathway of light beam 22 between the test matrix 19 and HUD surface 16 such that when the aspheric surface of aspheric mirror 28 is illuminated by beam 22, it reflects the test pattern in light beam 22.

Figure 8:
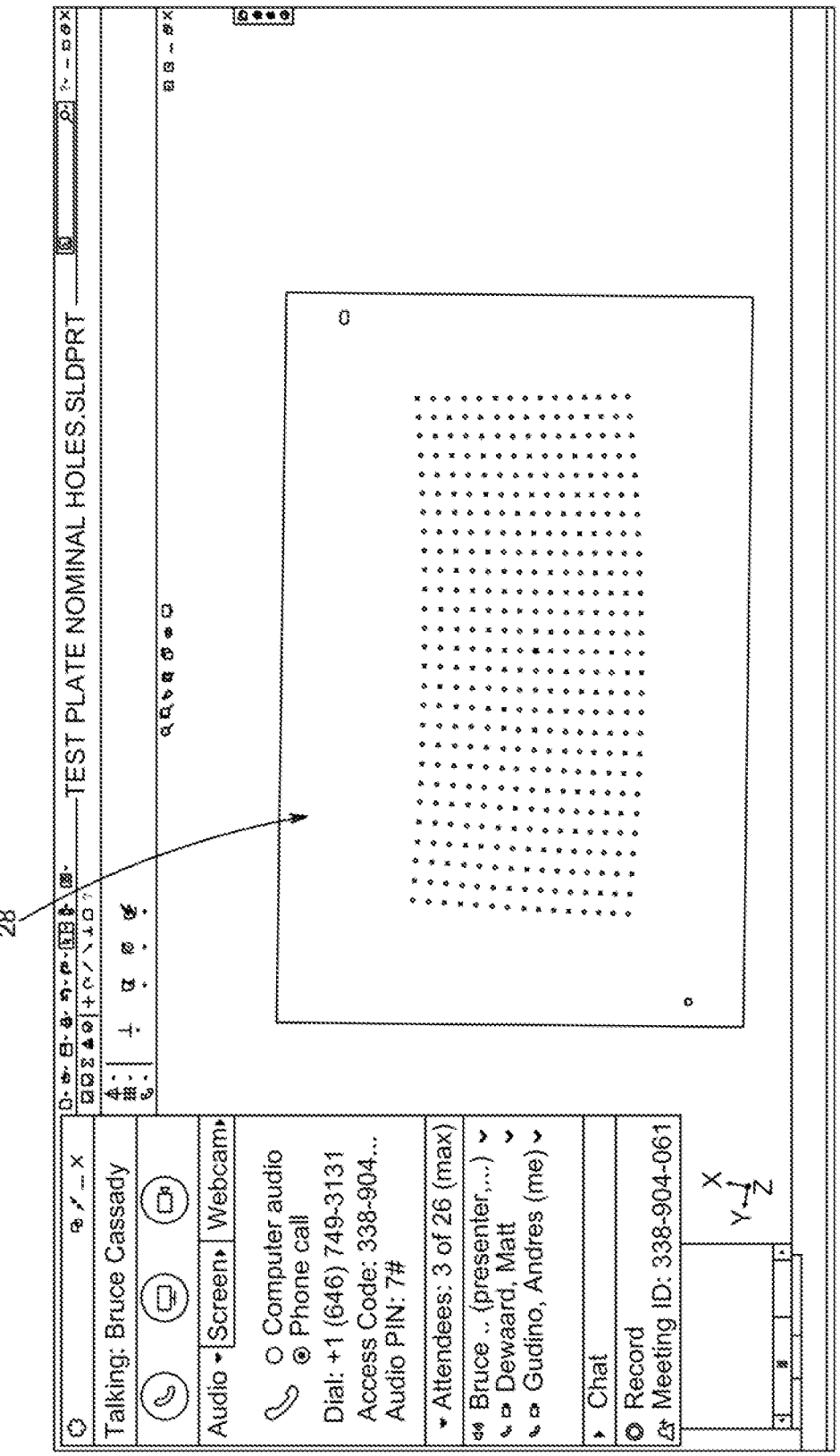
FIG. 8 shows an aspheric mirror of a type that is suitable for use in an embodiment such as illustrated in FIG. 5.

Aspheric mirror 28 compensates for curvatures in the windshield and aberrations in the HUD surface so that the test pattern that is reflected from HUD surface 16 can be better focused by camera 18. In this way, aspheric device 26 modifies light beam 22 to increase the resolution of at least a portion of the test pattern that is transmitted from the test matrix 19 such as light source and test grid 20 and reflected from HUD surface 16 to camera 18. A specimen of aspheric mirror 28 is shown in FIG. 8.

In the embodiment of FIG. 6, aspheric device 26 is a tunable lens 30. Tunable lens 30 may be a toroidal lens 32 such as a designed liquid lens or compensation lens as illustrated in FIG. 7. In the embodiment of a liquid lens, tunable lens 30 defines an aspheric surface that is positioned in the pathway of light beam 22 between HUD surface 16 and camera 18. The aspheric surface of the liquid lens refracts the test pattern of test matrix such as test grid 20 that is reflected from HUD surface 16. As a liquid lens, tunable lens 30 is illuminated by the test pattern that is reflected from HUD surface 16 toward camera 18 and refracts the light to compensate for curvatures in the windshield and aberrations in HUD surface 16.

In an alternative embodiment of tunable lens 30, tunable lens 30 includes electronic processing capability that modifies an electronic version of the optical image to electronically compensate for aberrations in HUD surface 16 and curvatures of windshield 12. In this way, tunable lens 30 enables camera 18 to better focus the image reflected from HUD surface 16.

Figure 8A:
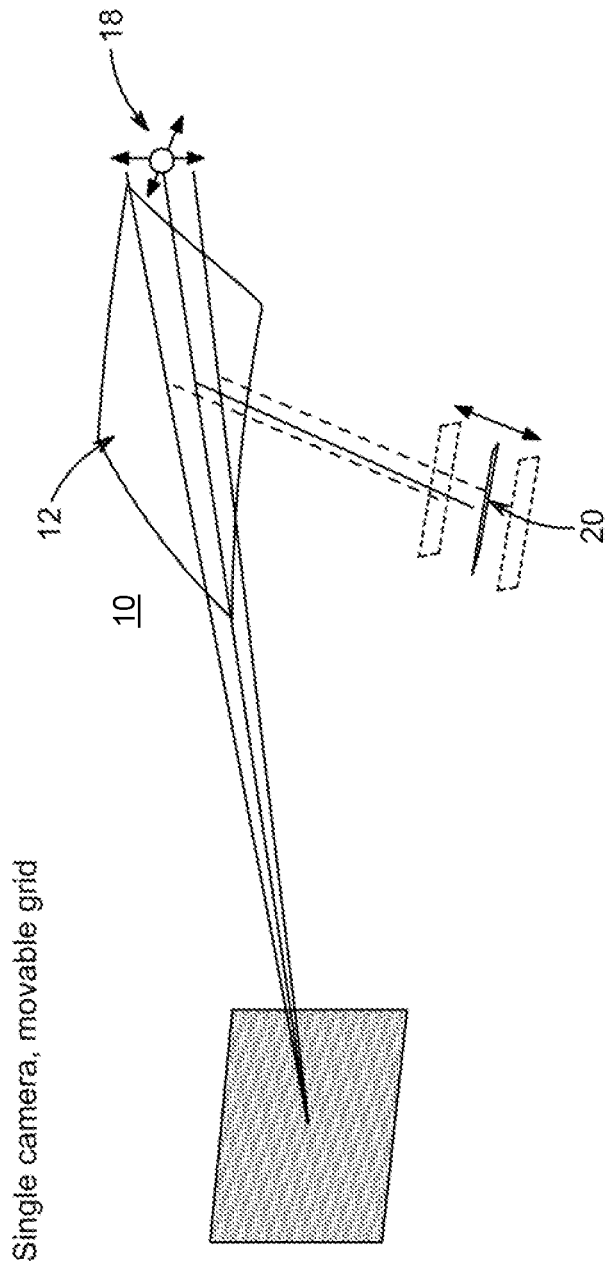
FIG. 8A illustrates the relationship between the preferred camera elevation and the moveable position of test grid 20.

The presently disclosed invention includes the use of a digital lens that is configured to compensate for multiple eye box positions. FIG. 8A illustrates a test fixture 10 wherein the test matrix such as test grid 20 is separated from HUD surface 16 by a space that is established according to the elevation the camera 18. In this embodiment, the position of test grid 20 can be moved away from HUD surface 16 and camera 18 can be moved to a lower elevation to better evaluate the HUD capability of windshield 12 with respect to operators having a stature that is shorter than average. To better evaluate the HUD compliance of windshield 12 from a higher camera elevation that corresponds to operators having a stature that is taller than average, the position of test grid 20 can be moved toward HUD surface 16 and camera 18 can be moved to a higher elevation relative to frame 14.

FIGS. 2, 3, and 4 show that the orientation of test grid 20 with respect to HUD surface 16 can be adjusted to control the angle of incidence between light beam 22 and HUD surface 16. In this way, the geometry relating to the ghost image reflected from surface 1 of windshield 12 can be changed such that the ghost image is superimposed on the reflection from the HUD surface 16 to obscure the ghost image. For this purpose, test grid 20 can be mounted on frame 14 on a pivotal mounting that is aligned with a first axis. Test grid 20 can be tilted on the first axis to adjust the angle of incidence of light beam 22. Further, test grid 20 can be tilted on a second axis to further adjust the angle of incidence of light beam 22. Such pivotal mounting enables adjustment of the separation between test grid 20 and HUD surface 16 to increase the resolution of the image of test grid 20 in the virtual heads-up image. Such a moveable test grid may be controlled by a robot arm for faster, repeatable control of the test grid position.

Adapting, the test fixture to a windshield having different geometry requires adjustments to the fixture. As an alternative to a movable test grid having a permanent, fixed form, the test matrix (i.e. the source of the HUD test pattern) may be a liquid crystal display that projects programmed images. The liquid crystal display avoids the need for mechanically repositioning a fixed test grid each time a different model windshield is tested. In that embodiment, the test pattern of a test grid is replaced by a programmed test pattern that may be changed electronically. This eliminates not only the need for mechanical adjustments to a fixed test grid between different eye box positions, but also the need to replace and calibrate a fixed test grid in correspondence with changes in the windshield model that is being tested.

Figure 9:
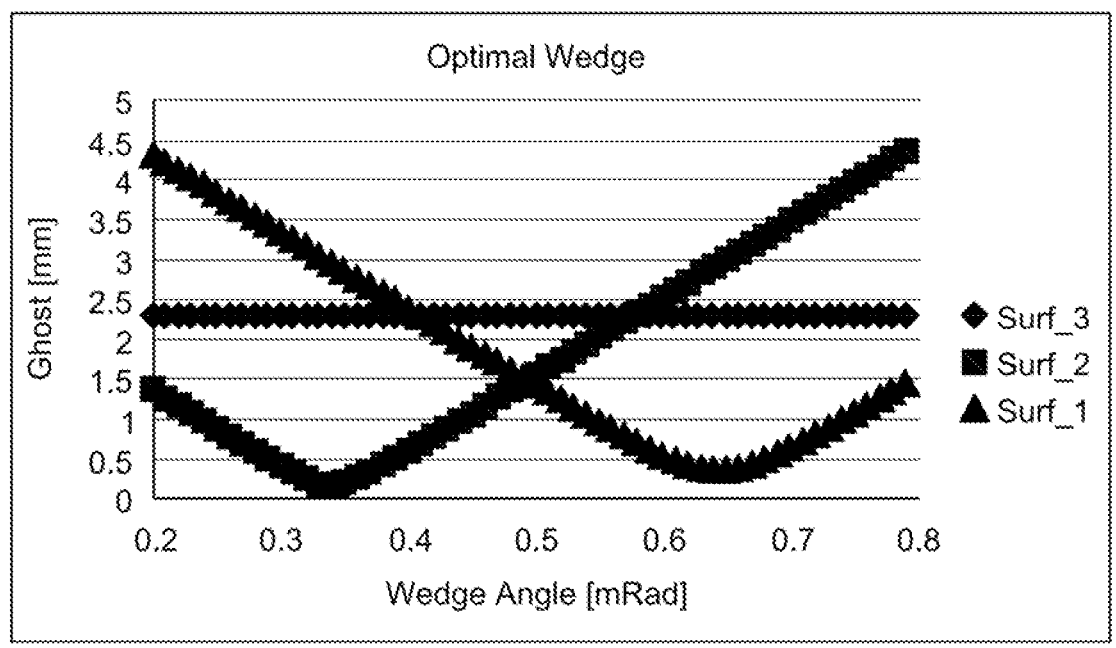
FIG. 9 illustrates a relationship between a primary virtual image and secondary ghost images as a function of the wedge angle.

The testing of windshield laminates that include IR coatings involves additional points for attention. FIG. 9 shows that the orientation of test grid 20 may be useful in obscuring a ghost image. Tilting the test grid may have the same effect as applying a wedge with an equivalent angular position. If the IR coating is located on the number 2 surface, the effect of tilting the test grid is similar to increasing the wedge angle by an equivalent angular amount. Thus, tilting the test grid or increasing the wedge can cause the secondary ghost to be obscured by the primary reflected image from surface 1 of windshield 12.

FIG. 10 shows that the reflection for various coatings is high in the IR range, but very low in the visible range between 460-680 nm. This means that the intensity of the secondary ghost from the IR coating is weak for visible light in the 460-680 nm range. FIG. 11 shows line graphs that further disclose the properties of secondary ghosts from IR coatings. The line graph for IR coatings and the accompanying table show that the reflecting property is weakest at 630 nm. This can be exploited to avoid the secondary ghosts from IR coatings while evaluating windshields with IR coatings.

Test fixture 10 may further include a light filter 36 that is located in the pathway of light reflected from HUD surface 16 to camera 18. Filter 36 transmits light within a predetermined bandwidth that is centered on a wavelength of 630 nm. The secondary ghost from the IR coating has low light intensity in this band and filter 36 rejects light outside of that bandwidth. Therefore, camera 18 captures a more distinct image of the virtual image.

The presently disclosed invention is not limited to the embodiments previously described herein and it will be apparent that other embodiments of the presently disclosed invention are included in the following claims.

We claim:

1. A fixture for testing the performance of the heads-up display feature of a windshield that is intended for use in a selected make and model of a vehicle, said fixture comprising:
   a frame for maintaining a windshield with a transparent panel that defines a heads-up display surface;
   a test matrix that is mounted on said frame and configured in accordance with a test pattern that corresponds to a windshield for a selected make and model of vehicle, said test matrix configured to generate a light beam that defines an image of said test pattern such that, at times when said light beam illuminates the heads-up display surface of said transparent panel, at least a portion of said light beam is reflected from the heads-up display surface of said transparent panel that is illuminated by said light beam;
   at least one camera having a tunable lens, said camera being mounted to said frame and located to receive and record images of said test pattern that are reflected from said heads-up display surface to the tunable lens of said camera; and
   a computer that is in communication with said camera, said computer being configured to identify and measure elements of said test pattern that are received by said camera, said computer comparing the image of said test pattern that is received by said camera with applicable performance specifications.

2. The test fixture of claim 1 wherein said test matrix is spaced apart from said heads-up display surface of said transparent panel, the separation between said test matrix and said heads-up display surface of said transparent panel being established according to the elevation of the said camera.

3. The test fixture of claim 2 wherein said test matrix is separated from said heads-up display surface of said transparent panel by a space that is established according to the orientation of said test matrix with respect to said frame.

4. The test fixture of claim 1 wherein the position and orientation of said test matrix is manipulated by a mechanical robot.

5. The test fixture of claim 1 further including a robot that manipulates the position of said camera.

6. The test fixture of claim 1 wherein an eyebox defines a location with respect to said frame from which a vehicle operator would view the HUD image reflected from the heads-up display surface of the transparent panel, said test fixture including two or more cameras having a tunable lens, each of said cameras being located in a respective eyebox.

7. The test fixture of claim 6 wherein the separation between said test matrix and said heads-up display surface is modified according to the elevation of said camera that receives and records images of said test pattern that are reflected from said heads-up display.

8. A fixture for testing the performance of the heads-up display feature of a windshield that is intended for use in a selected make and model of a vehicle, said fixture comprising:
   a frame for maintaining a windshield with a transparent panel that defines a heads-up display surface;
   a display panel that is mounted on said frame and displays a test pattern that corresponds to a windshield for a selected make and model of said vehicle, said display panel generating a light beam that defines an image of said test pattern such that, at times when said light beam illuminates the heads-up display surface of said transparent panel, at least a portion of said light beam is reflected from the heads-up display surface of said transparent panel that is illuminated by said light beam;
   at least one camera having a tunable lens, said camera being mounted to said frame and located to receive images of said test grid that are reflected from said heads-up display surface to the tunable lens of said camera; and
   a computer that is configured to identify and measure elements of said test pattern that pass through said tunable lens to evaluate applicable performance specifications.

9. The fixture of claim 8 wherein said display panel is configured to vary the test pattern in accordance with a camera that is selected in correspondence with an eyebox or in accordance with the windshield that is being tested.

10. The fixture of claim 9 wherein said display panel is a liquid crystal display.

11. The fixture of claim 9 wherein said display panel is a light modulator.

12. The fixture of claim 9 wherein said display panel is a projector.

13. The fixture of claim 9 wherein said display panel is an image generating unit.

14. The fixture of claim 12 wherein said projector has curved mirrors.

15. The fixture of claim 1 wherein said tunable lens is an electronically controlled lens.

16. The fixture of claim 1 wherein said tunable lens is a liquid lens.

17. The fixture of claim 1 wherein said tunable lens is variable focal length lens.

* * * * *